United States Patent [19]

Coronado

[11] Patent Number: 5,251,695
[45] Date of Patent: Oct. 12, 1993

[54] TUBING CONNECTOR

[75] Inventor: Martin P. Coronado, Houston, Tex.

[73] Assignee: Baker Hughes Incorporated, Houston, Tex.

[21] Appl. No.: 820,158

[22] Filed: Jan. 13, 1992

[51] Int. Cl.⁵ .................. E21B 17/043; F16L 21/04
[52] U.S. Cl. ............................ 166/242; 166/380; 285/370
[58] Field of Search ............ 166/180, 242, 380, 387; 285/323, 348, 370, 397

[56] References Cited

U.S. PATENT DOCUMENTS

| | | | |
|---|---|---|---|
| 3,248,135 | 4/1966 | Meripol | 285/323 |
| 4,712,813 | 12/1987 | Passerell et al. | 285/323 X |
| 5,156,206 | 10/1992 | Cox | 166/242 |

Primary Examiner—David J. Bagnell
Attorney, Agent, or Firm—Melvin A. Hunn

[57] ABSTRACT

A connector is provided for coupling a tubular member to a selected apparatus. The tubular member has inner and outer surfaces, and terminates at an end, with the inner surface at least in-part defining a central bore. A central body is provided with first and second ends. A linkage member is disposed at the first end of the central body for connecting the central body to a selected apparatus. A tubing coupler is disposed at the second end of the central body, and is operable in an insertion mode of operation in a radially-reduced position for insertion into the central bore of the tubular member, and a coupling mode of operation in a radially-expanded position for grippingly and sealingly engaging the inner surface of the tubular member.

21 Claims, 10 Drawing Sheets

TUBING CONNECTOR

BACKGROUND OF THE INVENTION

1. Field of the Invention

The present invention relates generally to connectors for use with tubing members, and specifically to connectors for use with coiled tubing strings of the type which are used to convey tools within a wellbore through the production tubing of the wellbore.

2. Description of the Prior Art

Recent advances in the technology relating to the work-over of producing oil and gas wells have greatly enhanced the efficiency and economy of work-over operations. Through the use of either a coiled-tubing string, or a wireline assembly, work-over operations can now be performed through the production tubing string of a flowing oil and gas well. Two extremely significant advantages have been obtained by the through-tubing technology advances. First, the production tubing string does not need to be removed from the oil and gas well in order to perform work-over operations. This is a significant economic advantage since work-over rigs are expensive, and the process of pulling a production tubing string is complicated and time consuming. The second advantage is that work-over operations can be performed without "killing" the well. The "killing" of a producing oil and gas well is a risky operation, and can irreparably damage the worked-over well. Until the recent advances in the through-tubing work-over technology, work-over operations usually required that the well be killed.

The through-tubing tools which are commercially viable at this time are predominantly fluid-pressure actuated, and most include an inflatable element which is run into the well in a radially-reduced position during a running mode of operation, and then selectively inflated into a radially-enlarged position during a setting mode of operation.

At present, these inflatable elements are commercially available in four sizes, with outer diameter dimensions ranging from 2.13 inches to 3.38 inches. It is thus possible to run these inflatable elements into wellbores through production tubing which is as small as 2.250 inches in inner diameter. Therefore, a through-tubing wellbore tool string may be expected to be passed through lengthy production tubing strings with less than 0.063 inches between the wellbore tool and the production tubing.

If the tubing-conveyed wellbore tool is unable to be passed through the entire length of the production tubing string, the significant benefits and advantages of using the through-tubing tool cannot be reaped. Furthermore, if the tubing-conveyed wellbore tool becomes stuck within the wellbore, either during running in or out of the well, many of the advantages of using tubing-conveyed, through-tubing wellbore tools disappear.

Different tool types have been designed, all using the inflatable element, to perform various work-over operations, including: permanent and temporary water shut-off of lower zones, zone abandonments, cement squeezing, gas shut-off of intermediate zones, acid and chemical treatments, selective acidizing, downhole flow modifications, fracturing isolation, and production testing operations. These tools typically include one or more fluid-actuated packing or plugging elements.

Tubing-conveyed wellbore tools require a secure connection to the lowermost end of the string of coiled tubing. Prior art tubing connectors operate by gripping the exterior of the tubing. These connectors include a fishing neck to facilitate fishing operations, should the connector fail to maintain a good connection with the tubing string and become separated from the tubing string. The fishing neck requires a structural profile. The prior art coupling between tubing string and wellbore tool also carries a seal to prevent leakage at the connection, and a gripping assembly to grip and hold the coiled tubing string. In order to meet all these objectives, the prior art tubing connector have a considerable thickness and thus extend into much of the clearance between the tubing string and the wellbore production tubing, increasing the risk of becoming stuck when running in or out of the wellbore.

SUMMARY OF THE INVENTION

It is one objective of the present invention to provide a tubing connector which couples to an interior surface of a tubing member, thus providing a low-profile connection.

It is another objective of the present invention to provide a tubing connector for use in connecting a fluid-actuated wellbore tool to a segment of coiled tubing, which includes gripping and sealing members which mate with an interior surface of the segment of coiled tubing.

It is still another objective of the present invention to provide a tubing connector which couples a fluid-actuated wellbore tool to a segment of coiled tubing, wherein the connector grippingly and sealingly engages the central bore of the segment of coiled tubing and does not rely upon gripping or sealing engagement with the exterior surface of the segment of coiled tubing, thus providing a low-profile connector which is especially useful in through-tubing wellbore operations.

It is yet another objective of the present invention to provide a tubing connector, which is especially useful in coupling fluid-actuated wellbore tools to segments of coiled tubing, which is urged between insertion and coupling positions by application of torque, and is unaffected by axial forces acting on the connector, and thus is less likely to become accidentally or unintentionally uncoupled.

These and other objectives are achieved as is now described. A connector is provided for coupling a tubular member to a selected apparatus. The tubular member has inner and outer surfaces, and terminates at an end, with the inner surface at least in-part defining a central bore. A central body is provided with first and second ends. A linkage member is disposed at the first end of the central body for connecting the central body to a selected apparatus. A tubing coupler is disposed at the second end of the central body, and is operable in an insertion mode of operation in a radially-reduced position for insertion into the central bore of the tubular member, and a coupling mode of operation in a radially-expanded position for grippingly and sealingly engaging the inner surface of the tubular member.

In the preferred embodiment, the tubing coupler includes a number of components which cooperate together, including: a connector mandrel, a sealing member, a gripping member, and an actuator. The connector mandrel is coupled to the central body and has a fixed radial dimension which is smaller than the central bore of the tubular member, to allow insertion into the central bore of the tubular member. The sealing member is circumferentially disposed about at least a portion of the connector mandrel, and is operable between an unset position with a reduced radial dimension and a set position with an expanded radial dimension. The sealing member is movable between the unset position and the set position in response to axial compression. The gripping member is circumferentially disposed about at least a portion of the connector mandrel. The actuator is provided for selectively urging the gripping member into gripping engagement with the inner surface of the tubular member, and for axially compressing the sealing member to urge it from an unset position out of contact with the inner surface of the tubular member, to a set position in contact with the inner surface of the tubular member.

Additional objects, features and advantages will be apparent in the written description which follows.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
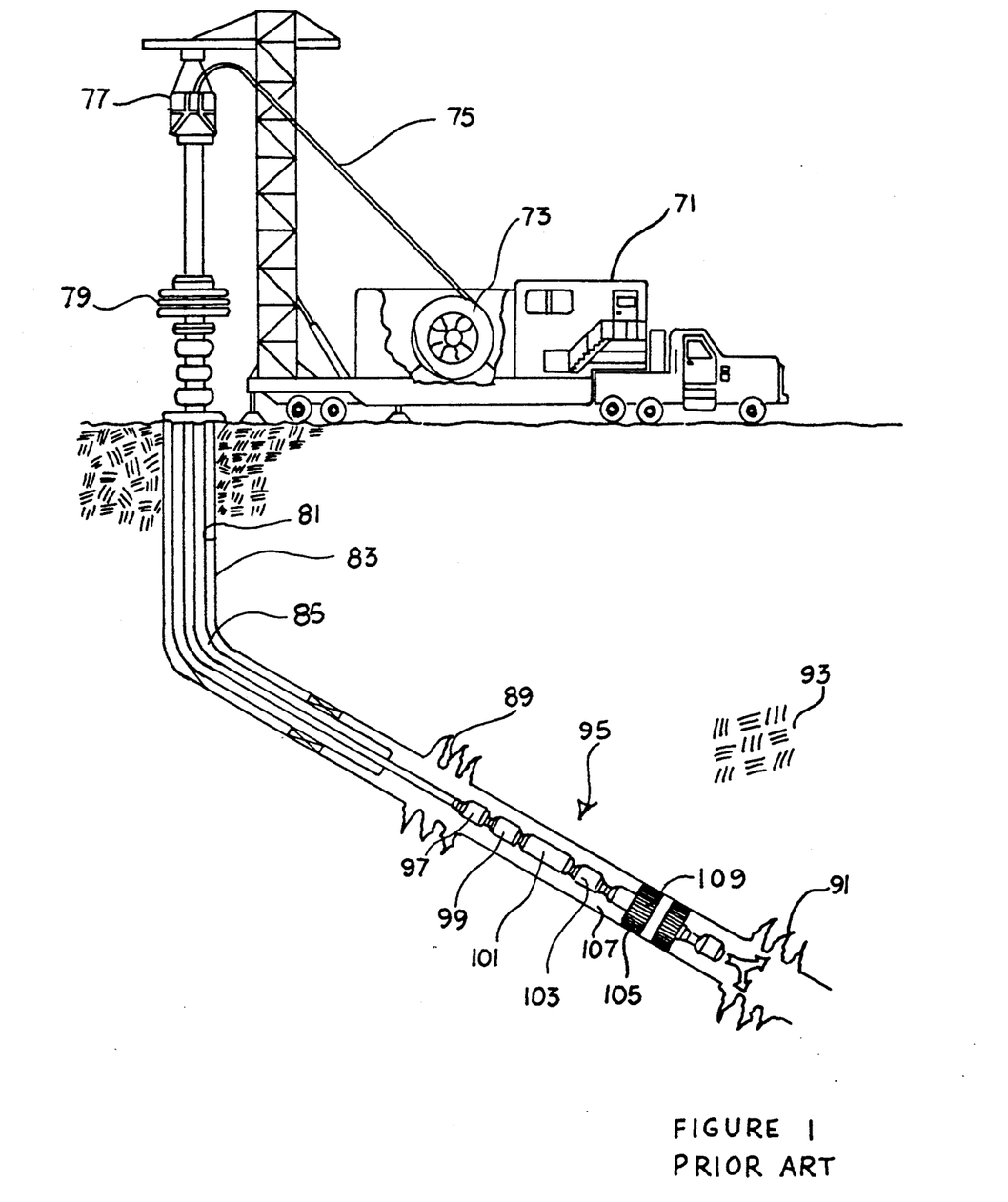
FIG. 1 is a perspective view of a prior art coiled tubing system which is used to convey wellbore tools within a wellbore.

A typical tubing-conveyed, through-tubing operation is shown in FIG. 1. As shown, coiled tubing truck 71 includes spool 73 for delivering coiled-tubing 75 to wellbore 81. Coiled-tubing 75 is directed downward through injection head 77 and blowout preventer 79. Coiled-tubing 75 is directed into wellbore 81 through production tubing string 85, which is concentrically disposed within casing 83. As is conventional, production tubing string 85 is packed-off against casing 83 at its lower end. Also, perforations 89, 91 are provided for delivering wellbore fluids, such as oil and water, from formation 93 into wellbore 81 in response to the pressure differential between formation 93 and wellbore 81.

As shown in FIG. 1, inflatable wellbore tool 95 is suspended within wellbore 81 on coiled-tubing string 75. Preferably, inflatable wellbore tool 95 includes a number of components which cooperate together, such as those components manufactured, operated, and offered for sale by Baker Service Tools, a division of Baker Hughes Production Tools, Inc. a wholly-owned subsidiary of Baker Hughes Incorporated, assignee of this patent application.

Coiled-tubing connector 97 operates to connect inflatable wellbore tool 95 to coiled-tubing string 75. High pressure fluid is directed downward into wellbore 81 through coiled-tubing string 75 and is received by inflatable wellbore tool 95. Check valve 99 is connected to the lowermost end of coiled-tubing connector 97, and operates to prevent the back flow of fluid upward into coiled-tubing string 75.

Tubing end locator 101 is coupled to check valve 99, and includes dogs which are movable between open and closed positions, which, when expanded, are larger in radial dimension than the inner diameter of production tubing string 85. Once inflatable wellbore tool 95 is passed through production tubing string 85, the dogs may be moved into a radially expanded position, and coiled-tubing string 75 may be drawn upward within wellbore 81, until the dogs engage the end of production tubing string 85. An increase in the weight carried by coiled tubing string 75 indicates that the dogs are in engagement with the lowermost end of production tubing string 85. This provides a positive indication of location of the wellbore tool string within the wellbore.

The wellbore tool string may then be moved to a desired location, and high pressure fluid maybe directed downward through coiled tubing string 75 to inflate inflatable wellbore tool 95, causing it to pack-off against the wellbore wall. Hydraulic disconnect 103 is coupled to tubing end locator 101, and operates to release bridge plug 109 from the rest of inflatable wellbore tool 95 when a preselected pressure threshold is exceeded by the fluid directed downward through coiled-tubing string 75.

The inflatable tool depicted in FIG. 1 is a bridge plug 105 which is inflated from a running mode of operation with a reduced radial dimension to a setting mode of operation in gripping engagement with casing 83. The passage of fluid upward or downward within wellbore 81 is obstructed by bridge plug 105 to achieve conventional opeating objectives.

Figure 2:
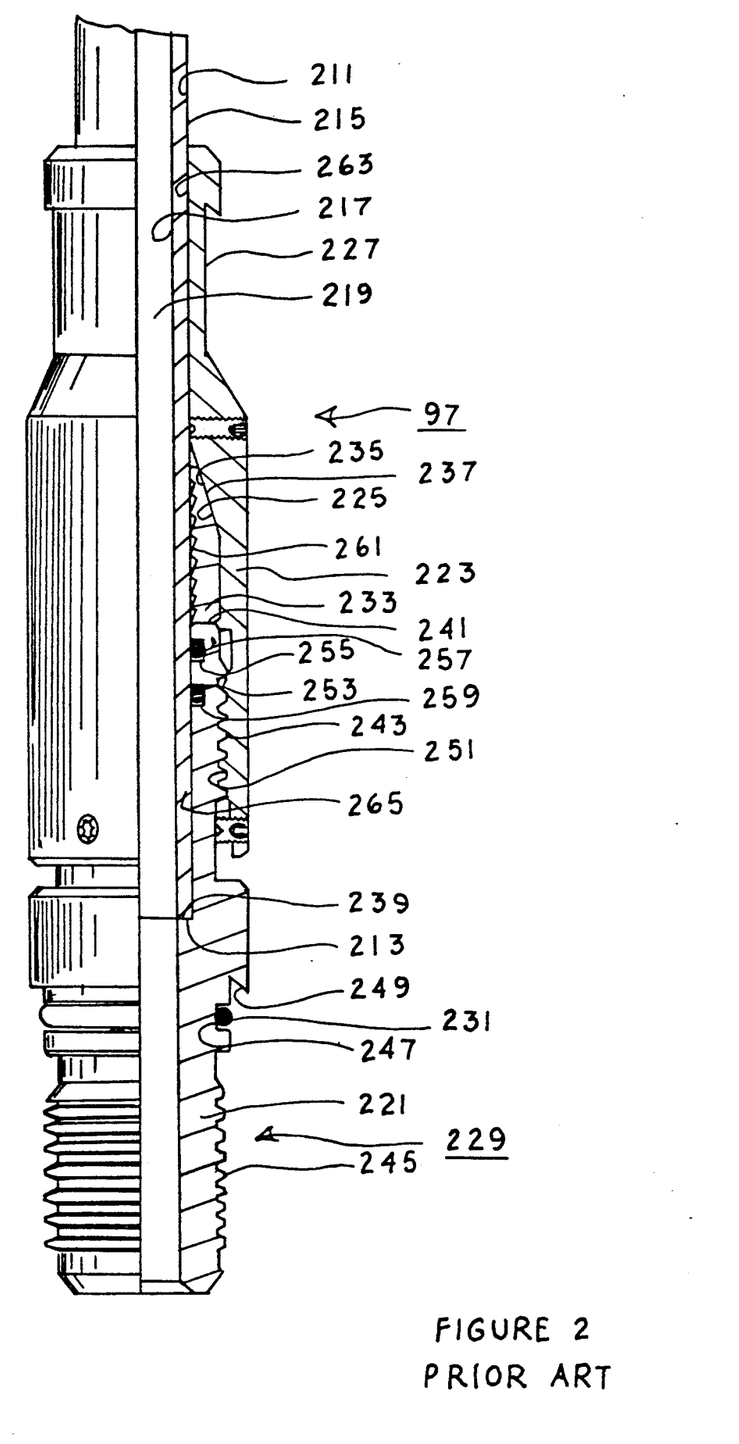
FIG. 2 is a one-quarter longitudinal section view of a prior art coiled tubing connector in gripping and sealing engagement with a segment of coiled tubing.

FIG. 2 is a one-quarter longitudinal section view of a prior art connector 97 which is used to couple through-tubing wellbore tools to segment 211 of coiled tubing 75. Segment 211 of coiled tubing 75 terminates at end 213, and includes outer surface 215 and inner surface 217. Inner surface 217 defines central bore 219 which extends upward through coiled tubing 75, and which serves to communicate high pressure fluids from a pump disposed at the earth's surface to the fluid-actuated, through-tubing wellbore tools which are connected to the lowermost end of connector 97 by tool coupling 229. Coiled tubing 75 is standard tubing which is used in tubing-conveyed wellbore operations, and has a two inch or smaller outside diameter.

Connector 97 is composed of three interlocking components: connector body 221, connector housing 223, and gripping sleeve 233. Connector housing 223 defines fishing neck 227 at its uppermost end, which facilitates retrieval of connector 97 (and any wellbore tools coupled thereto) in the event that it becomes inadvertently separated from coiled tubing 75. Connector housing 223 further defines annular gripping cavity 225 therein, which is adapted and shaped for receiving gripping sleeve 233. Gripping sleeve 233 includes inclined annular outer surface 237 which is adapted for engaging incline annular surface 235 of annular gripper cavity 225, but also includes gripping teeth 261 on an inner surface for engaging outer surface 215 of segment 211.

Connector housing 223 is circumferentially disposed about outer surface 215 of segment 211 of coiled tubing 75. Gripping sleeve 233 is likewise circumferentially disposed about a portion of outer surface 215 of segment 211 of coiled tubing 75. Connector body 221 is in-part circumferentially disposed about a portion of outer surface 215 of segment 211 of coiled tubing 75.

Connector body 221 includes upper and lower external threads 243, 245, with lower external threads 245 serving for connection with a wellbore tool, and upper external threads 243 serving to couple with internal threads 251 of connector housing 223. Connector body 221 is further equipped with external O-ring groove 247 at its lowermost end for receiving O-ring seal 231 which sealingly engages the wellbore tool which is coupled to connector 97. Tool lip 249 also serves to facilitate coupling with the wellbore tool. Connector body 221 further includes internal O-ring grooves 253, 255 which are adapted for receiving O-ring seals 257, 259 for sealing engagement with outer surface 215 of segment 211 of coiled tubing 75. Connector body 221 terminates at its uppermost end at shoulder 241 which is in abutment with the lowermost end of gripping sleeve 233. Connector body 221 further includes internal shoulder 239 which is adapted for receiving end 213 of segment 211 of coiled tubing 75.

In operation, segment 211 of coiled tubing 75 is inserted into central bore 263 of connector housing 223, and into a portion of central bore 265 of connector body 221, until end 213 is in abutment with internal shoulder 239. Then, connector body 221 is rotated clockwise relative to stationary connector housing 223, causing connector body 221 to advance upward into annular gripper cavity 225, and into abutting and driving engagement with gripper sleeve 233. As connector body 221 advances relative to connector housing 223, gripping sleeve 233 is driven upward urging inclined annular surface 235 to slidably engage inclined annular 237, causing gripping sleeve 233 to be wedged under a portion of connector housing 223. This wedging action causes gripping teeth 261 to grippingly engage outer surface 215 of segment 211 of coiled tubing 75. Counterclockwise rotation of connector body 221 will cause shoulder 241 of connector body 221 to retract from annular gripper cavity 225, allowing gripping sleeve 233 to become unwedged from connector housing 223, and release gripping engagement of outer surface 215 of segment 211 of coiled tubing 75.

As discussed above, this prior art connector 97 includes components which are disposed entirely outside of coiled tubing 75, thus increasing the risk of becoming stuck within the production tubing during running in or out of the wellbore.

Figure 3:
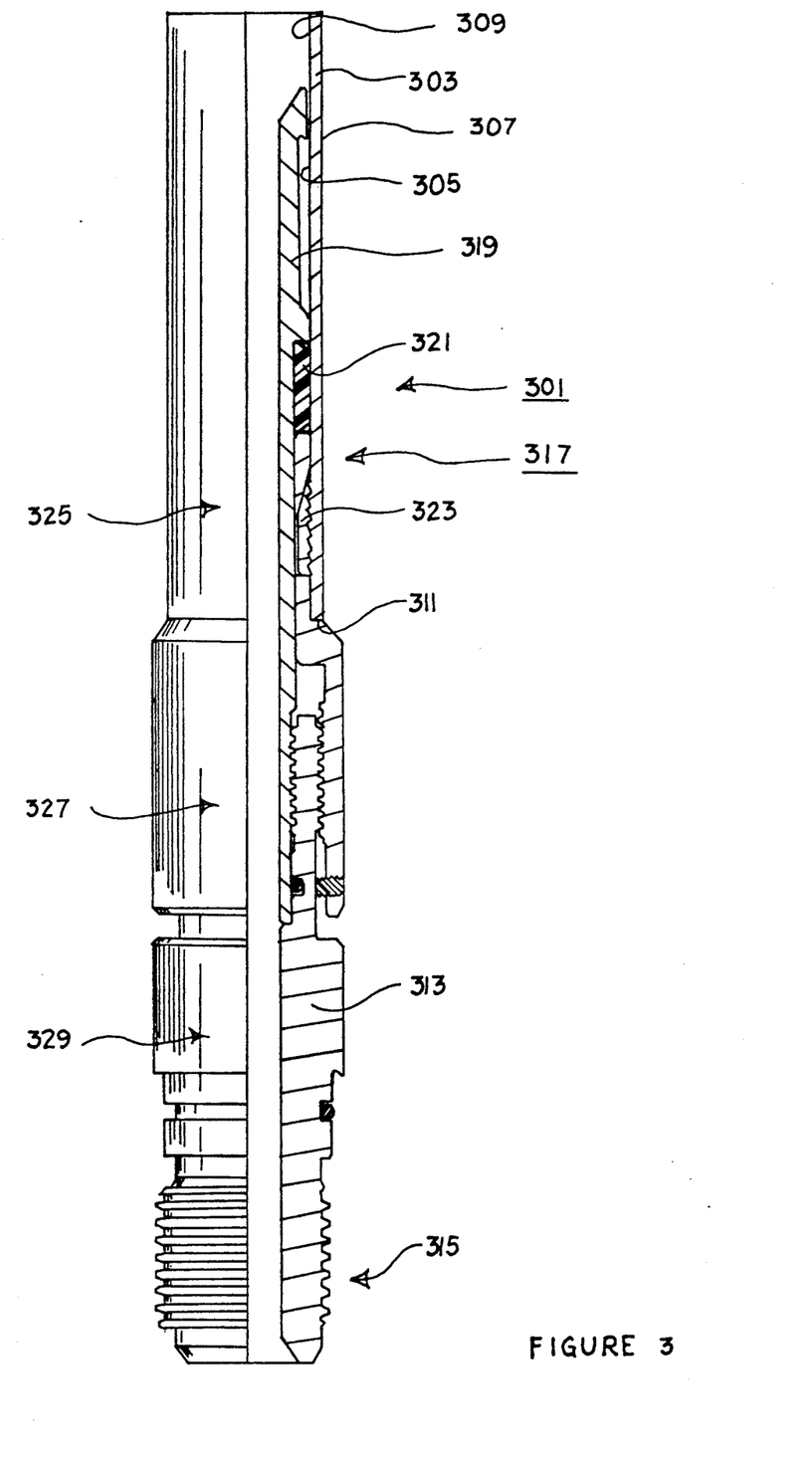
FIG. 3 is a one-quarter longitudinal section view of the preferred embodiment of the tubing connector of the present invention in a coupled condition.

The disadvantages of the prior art tubing connectors are overcome in the preferred tubing connector 301 of the present invention, which is depicted in one-quarter longitudinal section view in FIG. 3, with the tubing connector 301 in gripping and sealing engagement with coiled tubing 75. As shown therein, segment 303 of coiled tubing 75 terminates at end 311, and includes inner and outer surfaces 305, 307, with inner surface 305 defining central bore 309, through which pressurized fluid is pumped downward into fluid-actuated wellbore tools.

In the preferred embodiment of the present invention, tubing connector 301 comprises a plurality of components which cooperate together, including: central body 313, linkage member 315, and tubing coupler 317. Linkage member 315 is disposed at the lowermost portion of central body 313, and serves to releasably couple with fluid-actuated wellbore tools. In the preferred embodiment of the present invention, tubing coupler 317 includes components which sealingly and grippingly engage inner surface 305 of segment 303 of coiled tubing 75. Preferably, tubing coupler 317 includes connector mandrel 319, sealing member 321, and gripping member 323. Connector mandrel 319 is coupled to central body 313 and has a radial dimension smaller than central bore 309 of segment 303 of coiled tubing 75 to allow insertion into central bore 309 of segment 303. Sealing member 321 is circumferentially disposed about at least a portion of connector mandrel 319. Gripping member 323 is circumferentially disposed about at least a portion of connector mandrel 319.

A means is provided for selectively urging sealing member 321 and gripping member 323 radially outward from connector mandrel 319 into respective sealing and gripping engagement with inner surface 305 of segment 303 of coiled tubing 75. Preferably, this is accomplished by providing a plurality of threaded connections between connector mandrel 319, central body 313 and other components, which receive torque in a selected direction, and contracts connector mandrel 319 relative to central body 313 to move the preferred tubing connector 310 between in insertion mode of operation, with sealing member 321 and gripping member 323 in a radially-reduced positions for insertion at end 311 into central bore 309, and a coupling mode of operation, with sealing member 321 and gripping member 323 in radially-expanded positions for grippingly and sealingly engaging inner surface 305 of segment 303 of coiled tubing 75.

The upper, middle, and lower sections 325, 327 and 329 of the preferred tubing connector 301 of the present invention will be discussed in greater detail below with reference to FIGS. 4 through 6, wherein tubing connector 301 is displayed in both set and unset positions. FIGS. 4a, 4b, and 4c depict upper, middle, and lower regions of the preferred tubing connector 301 of the present invention inserted within segment 303 but in an uncoupled condition. In contrast, FIGS. 5a, 5b, and 5c respectively depict upper, middle, and lower regions of the preferred tubing connector 301 of the present invention, in gripping and sealing engagement with segment 303. FIG. 6 is an enlarged fragmentary view of upper region 325 of the preferred embodiment of tubing connector 301 of the present invention in gripping and sealing engagement with segment 303.

Figure 4A:
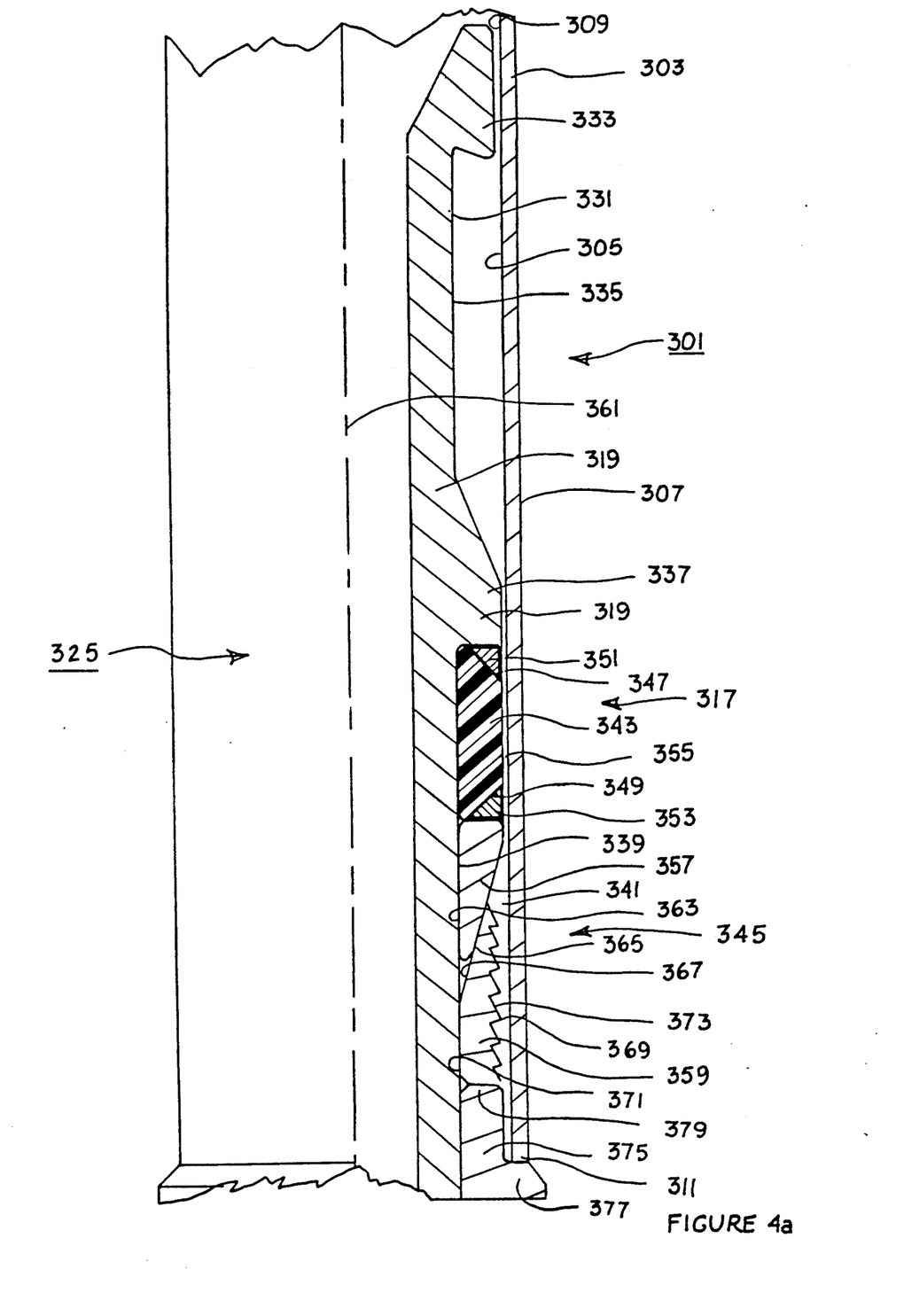
FIGS. 4a, 4b, and 4c are fragmentary one-quarter longitudinal section views of the preferred embodiment of the present invention, respectively depicting an upper, middle, and lower region of said tubing connector, which is in-part inserted in a tubing member but in an uncoupled condition.
Figure 4B:
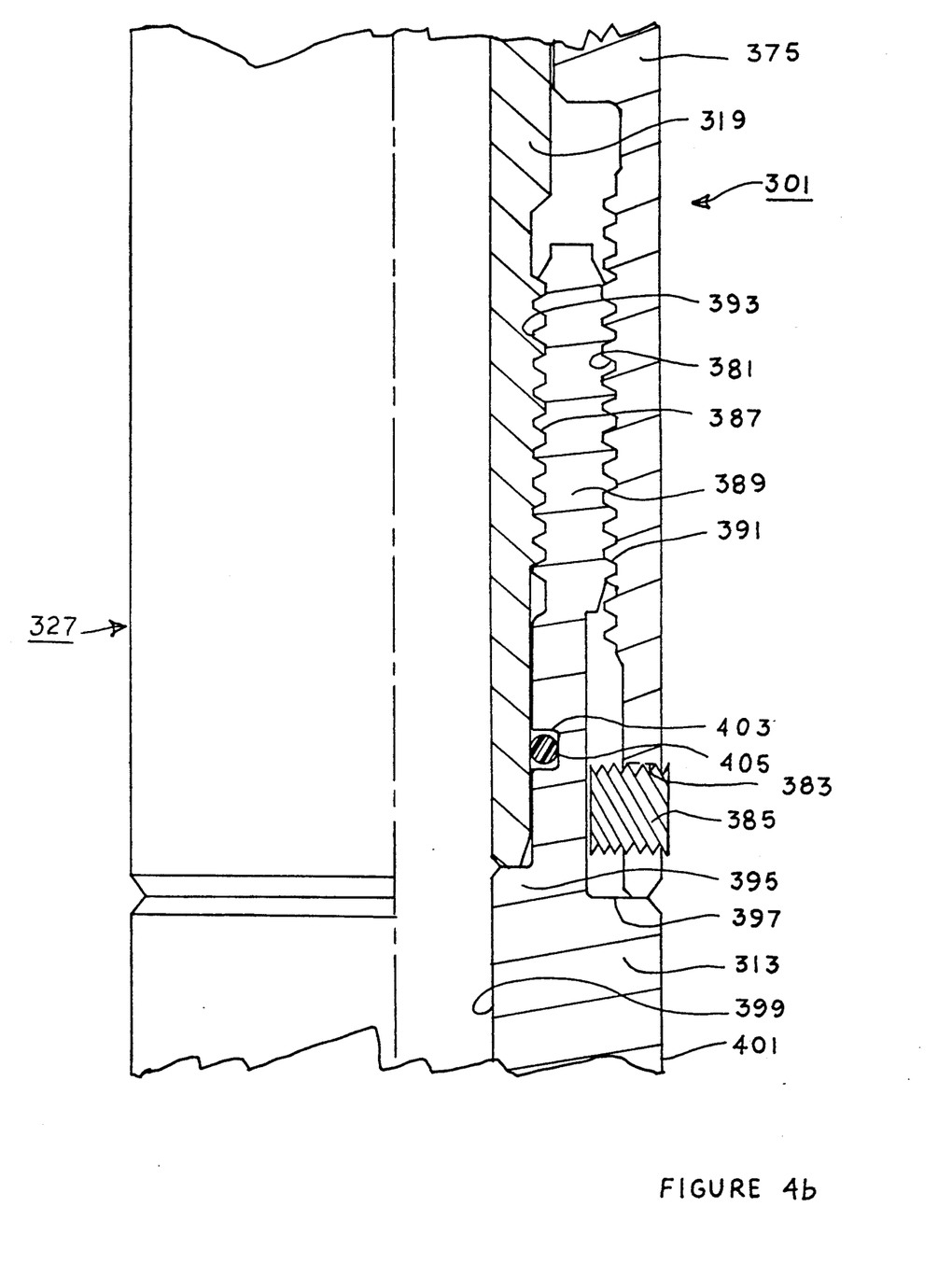

Referring now to FIG. 4a, wherein upper region 325 is displayed in one-quarter longitudinal section view, connector mandrel 319 extends upward into central bore 309 of tubing segment 303, and is disposed a fixed, predetermined distance radially inward from inner surface 305 of tubing segment 303. Fishing neck 331 is disposed at the uppermost end of connector mandrel 319, and includes a profile which is suitable for engagement with industry-standard fishing tools. Fishing neck 331 is useful only in the event of tubing connector 301 becoming disengaged from tubing segment 303. In the preferred embodiment, fishing neck 331 includes external shoulder 333, and recess region 335 which allow a fishing tool to couple with connector mandrel 319 for retrieval operations.

Connector mandrel 319 of tubing connector 301 further includes external shoulder 337, which is disposed downward from fishing neck 331. Preferably, external shoulder 337 is disposed immediately above a recessed region 339, which has a radial dimension which is less than that of external shoulder 337. Also, preferably, external shoulder 337 forms an upper boundary for annular cavity 341 which is defined by a radially inward boundary of recess region 339, and a radially outward boundary of inner surface 305 of tubing segment 303. In the preferred embodiment, annular sealing member 343 and gripping assembly 345 are circumferentially disposed about recessed region 339 of connector mandrel 319, within annular cavity 341 between connector mandrel 319 and inner surface 305 of tubing segment 303. Preferably, annular sealing member 343 comprises an elastomeric sleeve (in high temperature applications a thermoplastic sleeve may be used), having outwardly-facing inclined upper and lower ends 347, 349, with upper end 347 in abutment with upper extrusion prevention ring 351, which is triangular in cross-section view and which is disposed between annular sealing member 343 and external shoulder 337 of connector mandrel 319. Lower end 349 of annular sealing member 343 is in abutment with lower extrusion prevention ring 353, which is also triangular in cross-section view and which is disposed between annular sealing member 343 and gripping assembly 345. During an insertion mode of operation, such as shown in FIG. 4a, annular sealing member 343, and upper and lower extrusion prevention rings 351, 353 are out of contact with inner surface 305 of tubing segment 303. As will be discussed in greater detail here below, annular sealing member 343 may be urged between the insertion mode of operation and a sealing mode of operation, placing annular sealing member 343 in sealing engagement with inner surface 305 of tubing segment 303. Upper and lower extrusion prevention rings 351, 353 will also be in contact with inner surface 305 of tubing segment 303 during the sealing mode of operation, but serve to prevent upward and downward extrusion of the elastomeric material which comprises annular sealing member 343.

In the preferred embodiment, gripping assembly 345 is circumferentially disposed about recessed region 339 of connector mandrel 319, within annular cavity 341, between connector mandrel 319 and inner surface 305 of tubing segment 303. As shown, gripping assembly 345 is in axial alignment with annular sealing member 343. In the preferred embodiment, gripping assembly 345 comprises cone member 357 and slip member 359. Cone member 357 and slip member 359 are generally triangular-shaped in cross-section and are disposed within annular cavity 341 in substantial axial alignment, with only slight overlap. Cone and slip members 357, 359 respond to axial loading by wedging together and moving between a radially-reduced insertion position, out of contact with inner surface 305 of tubing segment 303, into a radially-expanded gripping position in contact with inner surface 305 of tubing segment 303.

In the preferred embodiment, cone member 357 includes inner surface 363 which is substantially parallel with, and sliding engages, recessed region 339 of connector mandrel 319. Cone member 357 also includes inclined outer surface 365 which is disposed at an angle from central axis 361 of connector mandrel 319. Preferably, slip member 359 includes inner surface 371 which is in-part substantially parallel with central axis 361 of connector mandrel 319, and in-part inclined at an angle from central axis 361, at inclined inner surface 367. Slip member 359 further includes outer surface 373 which carries a plurality of annular gripping teeth 369. In the preferred embodiment of the present invention, cone members 357 and slip member 359 are oriented so that inclined inner surface 367 and inclined outer surface 365 slidably engage one another.

When cone member 357 and slip member 359 are in substantial axial alignment, with little overlap between inclined outer surface 365 and inclined inner surface 367, gripping assembly 345 assumes a radially-reduced insertion position, out of contact with central bore 309 of tubing segment 303. However, when axial load (that is, axial force) is applied to cone member 357, and slip member 359, gripping assembly 345 assumes a radially-expanded gripping position in contact with central bore 309 of tubing segment 303, with gripping teeth 369 in gripping engagement with inner surface 305 of tubing segment 303.

The lower end of slip member 359 is in abutment with upper end 379 of buttress member 375. Buttress member 375 further includes external shoulder 377, which is contoured for receiving end 311 of tubing segment 303. The remainder of buttress member 375 is depicted in FIG. 4b, which is a one-quarter longitudinal section view of middle region 327 of the preferred tubing connector 301 of the present invention. Buttress member 375 is disposed between end 311 of tubing segment 303 and central body 313. In the preferred embodiment, buttress member 375 includes internal threads 381 at an intermediate position, and internally-threaded set screw port 383, which is one of a plurality of internally-threaded set screw ports, each of which are adapted for receiving externally-threaded set screw 385. When set screw 385 is advanced internally relative to internally-threaded set screw port 383, it will be set against central body 313, preventing rotation of central body 313 relative to buttress member 375 (in FIG. 4b, set screw 385 is shown out of contact with buttress member 375).

The lowermost portion of connector mandrel 319, and the lowermost portion of buttress member 375, are in substantial axial alignment, with the lowermost portion of connector mandrel 319 disposed radially inward from buttress member 375. External threads 387 are provided on the lowermost portion of connector mandrel 319. Drive portion 389 of central body 313 is disposed between connector mandrel 319 and buttress member 375, and is equipped with external threads 391 and internal threads 393. External threads 391 of drive portion 389 engage internal threads 381 of buttress member 375, while internal threadsd 393 engage external threads 387 of connector mandrel 319. Therefore, driver portion 389 of central body 313 is sandwiched between the lowermost portions of connector mandrel 319 and buttress member 375, and is coupled to both by threaded couplings.

Annular O-ring groove 403 is disposed at the lowermost region of driver portion 389, and carries O-ring seal 405 which is in abutment with connector mandrel 319, and provides a fluid-tight seal. Central body 313 further includes internal and external shoulders 395, 397 on interior and exterior surfaces 399, 401. Internal shoulder 395 is adapted for engaging connector mandrel 319, and external shoulder 397 is adapted for engaging buttress member 375. The depiction of central body 313 is continued on FIG. 4c, which is one-quarter longitudinal section view of central body 313. The lowermost portion of central body 313 predominantly comprises linkage member 315, which in the preferred embodiment consists of external shoulder 407, annular O-ring groove 409, O-ring seal 411, and external threads 413. All these components cooperate together to facilitate coupling of central body 313 with internally threaded wellbore tools. Annular O-ring groove 409 and O-ring seal 411 cooperate to provide a fluid-tight seal between central body 313 and the wellbore tool. External threads 413 operate to engage internal threads of the connected wellbore tool.

Figure 5A:
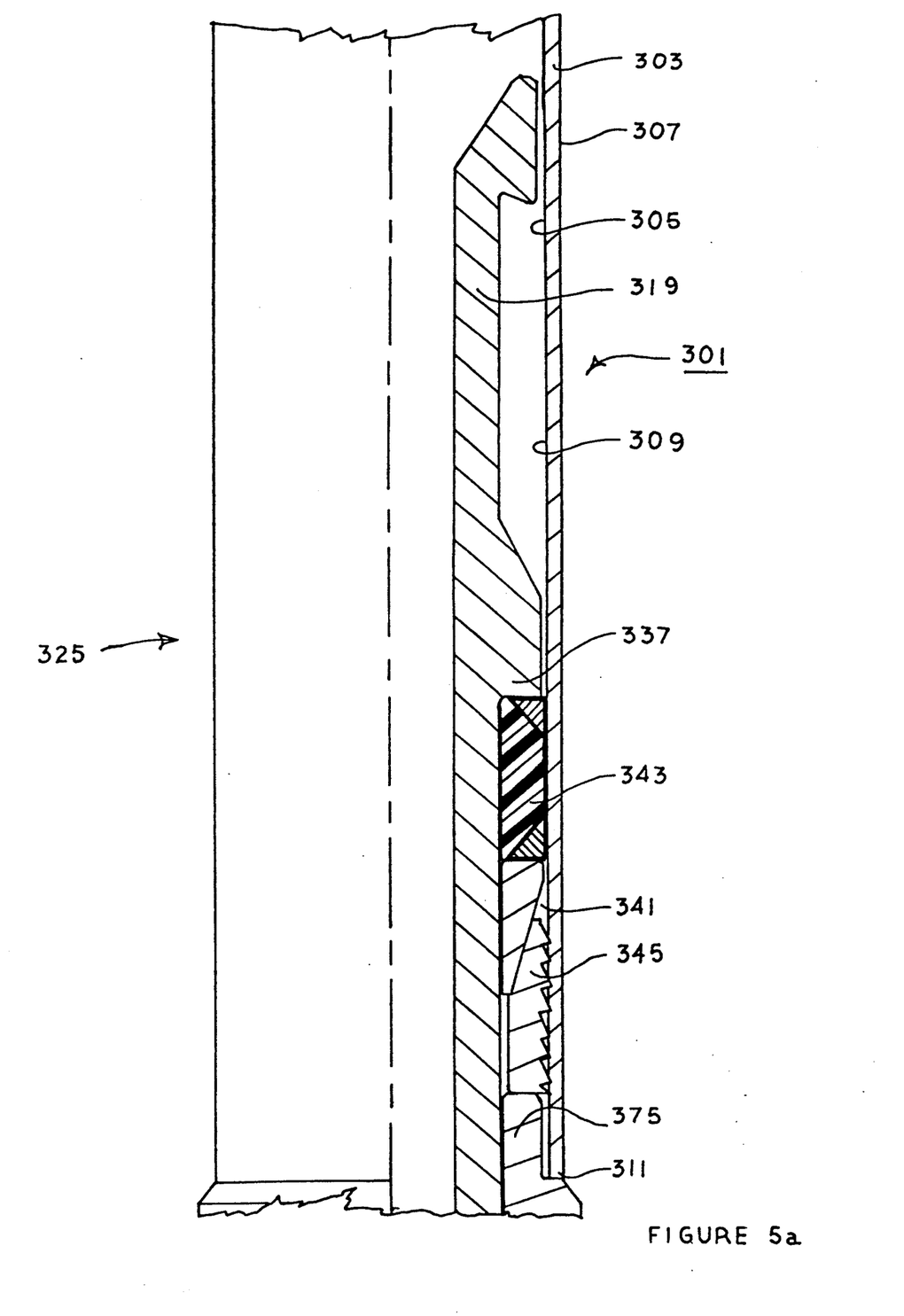
FIGS. 5a, 5b, and 5c are fragmentary one-quarter longitudinal section views of the preferred embodiment of the present invention, respectively depicting an upper, middle, and lower region of said tubing connector, in gripping and sealing engagement with a tubing member.
Figure 5B:
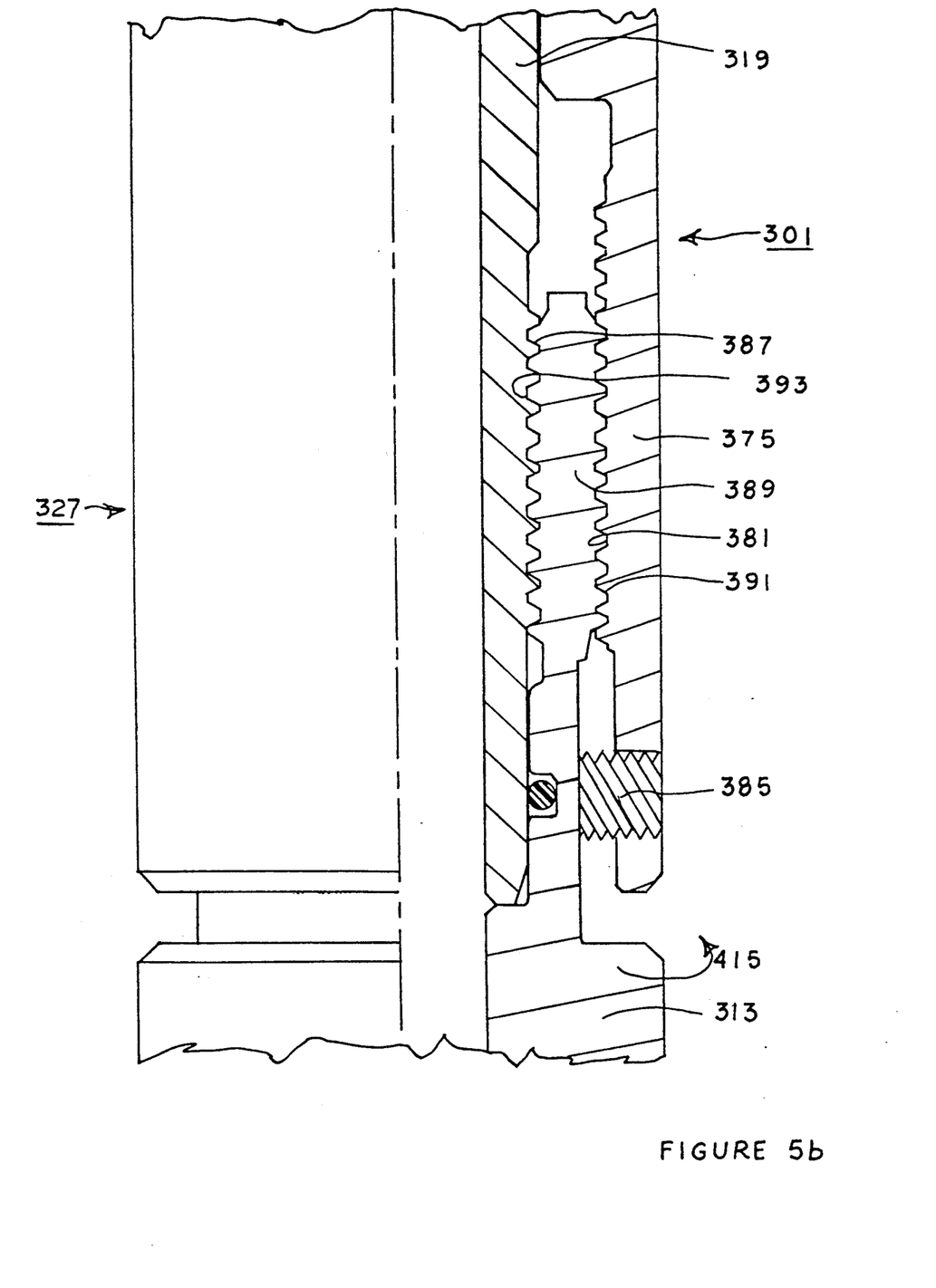
Figure 5C:
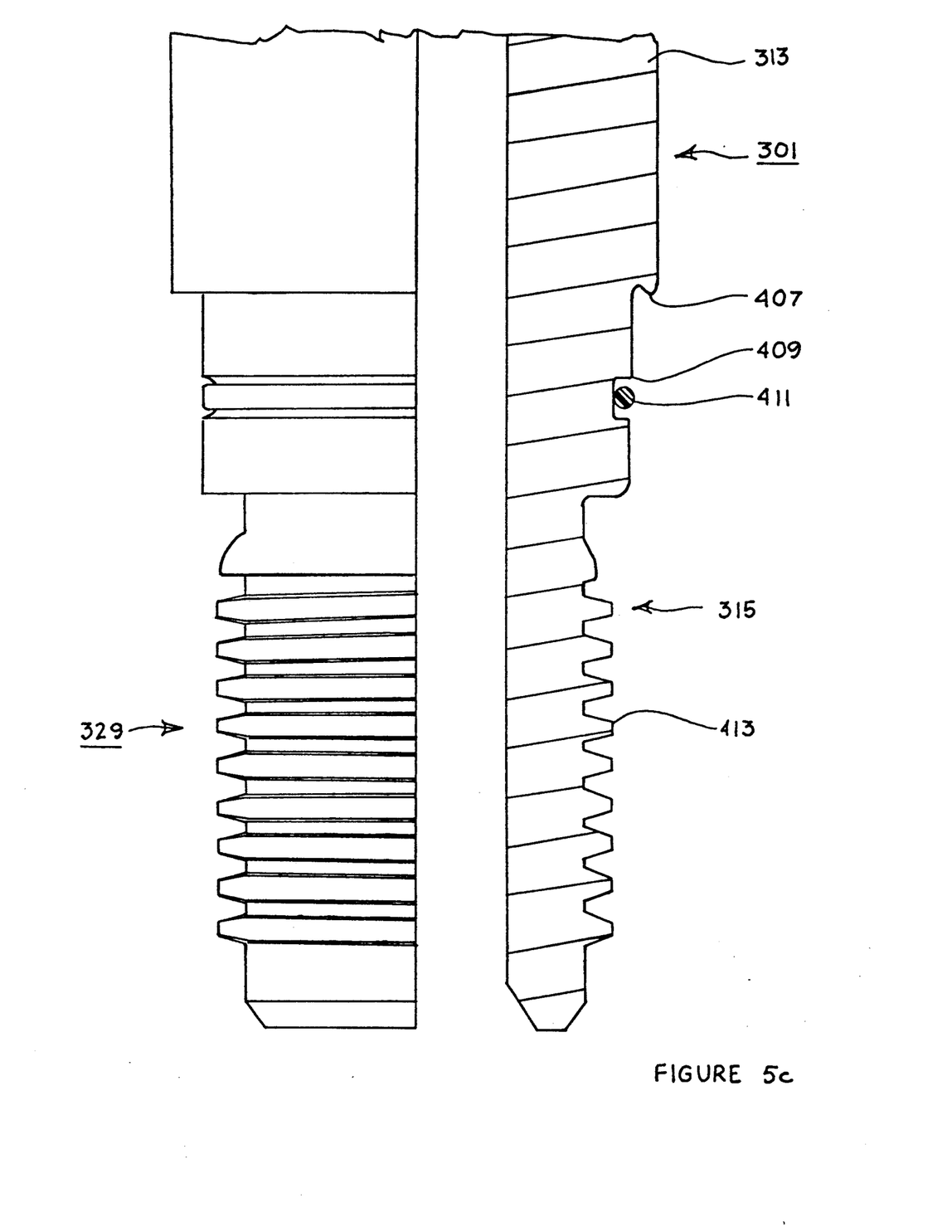
Figure 6:
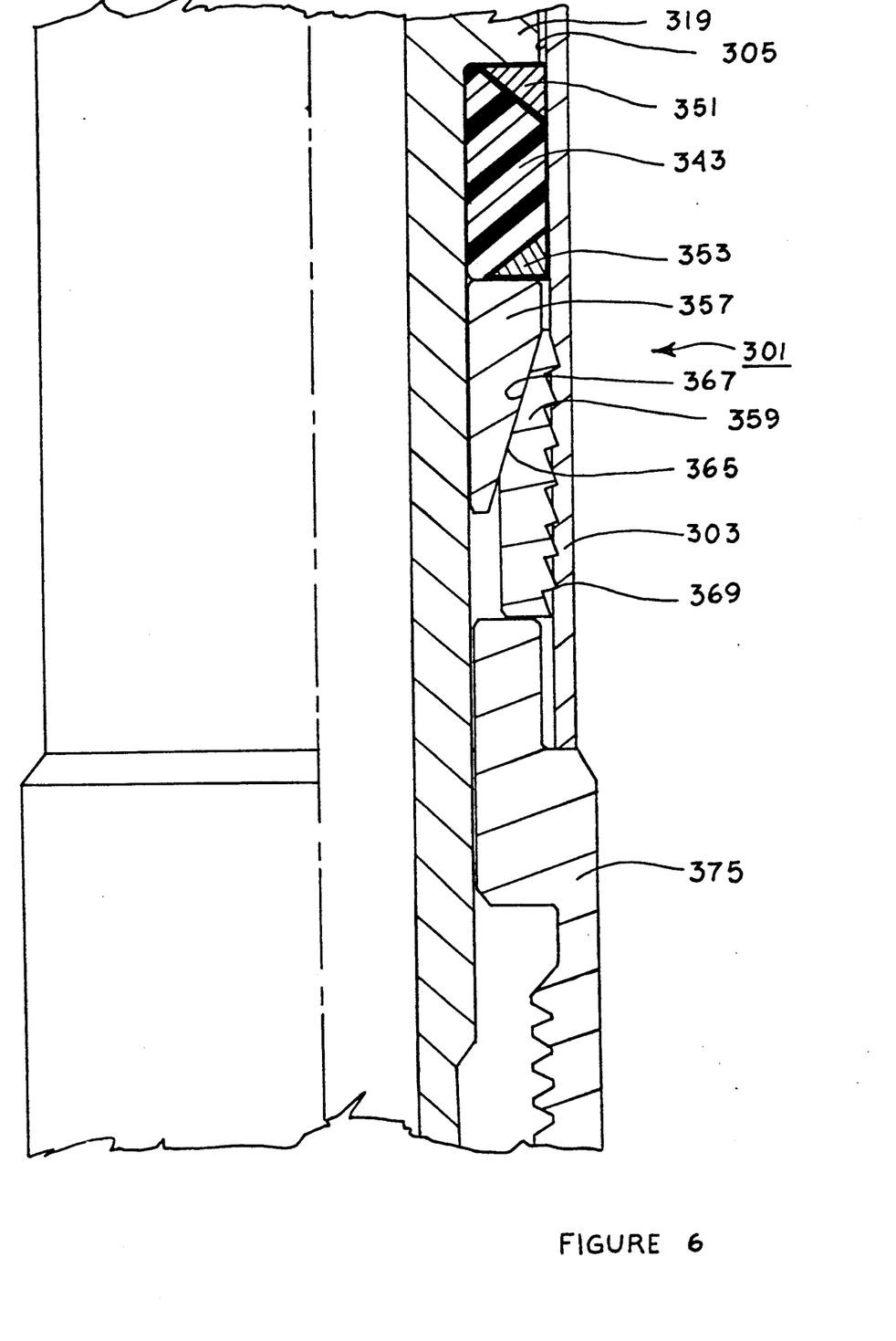
FIG. 6 is an enlarged fragmentary one-quarter section view of the upper region of the preferred embodiment of the tubing connector of the present invention in gripping and sealing engagement with a tubular member.

FIGS. 5a, 5b, and 5c are fragmentary one-quarter longitudinal section views of the preferred embodiment of the tubing connector 301 of the present invention, respectively depicting upper, middle, and lower regions 325, 327, and 329 of tubing connector 301, in gripping and sealing engagement with central bore 309 of tubing segment 303. In the preferred embodiment of the present invention, annular sealing member 343 and gripping assembly 345 are urged between radially-reduced unset positions and radially-expanded set positions for respective sealing and gripping engagement with inner surface 305 of tubing segment 303 in response to downward axial movement of connector mandrel 319 relative to buttress member 375. As connector mandrel 319 is moved axially downward, external shoulder 337 bears upon annular sealing member 343 and gripping assembly 345, effectively reducing the area of annular cavity 341 by shortening it. Essentially, connector mandrel 319 is retracted in position relative to buttress member 375. The relative movement of connector mandrel 319 relative to buttress member 375 energizes annular sealing member 343, urging it radially outward from connector mandrel 319, and wedges gripping assembly 345 together, as is best depicted in the one-quarter longitudinal section view of FIG. 6.

With reference now to FIG. 6, annular sealing member 343 is shown in a compressed, and energized, condition, in a radially-expanded position in sealing contact with inner surface 305 of tubing segment 303. Upper and lower extrusion prevention rings 351, 353 are likewise in engagement with inner surface 305 of tubing segment 203. Upper and lower extrusion prevention rings 351, 353 serve to prevent the extrusion of the elastomeric material of annular sealing member 343 both upward and downward in the gap between connector mandrel 319 and tubing segment 303, and also the gap between cone member 357 and tubing segment 303. FIG. 6 also depicts cone member 357 wedged underneath slip member 359, and urging slip member 359 radially outward into gripping engagement with tubing segment 303 with gripping teeth 369. As is shown in FIG. 6, cone member 357 is moved downward relative to slip member 359, causing sliding engagement between cone member 357 and slip member 359 at the interface of inclined outer surface 365 and inclined inner surface 367.

In FIG. 5b the mechanism by which connector mandrel 319 is moved axially downward relative to buttress member 375 is shown. As discussed above, driver portion 389 of central body 313 includes internal threads 393 and external threads 391. Internal threads 393 of driver portion 389 mate with external threads 387 of connector mandrel 319. External threads 391 of drive portion 389 mate with internal threads 381 of buttress member 375. In the preferred embodiment, internal threads 381 of buttress member 375 are left-hand turn threads. External threads 391 of driver portion 389 are likewise left-hand turn threads. External threads 387 of connector mandrel 319 are right-hand turn threads. Internal threads 393 of driver portion 389 are likewise right-hand turn threads. Clockwise (that is, right-hand) rotation of central body 313 will not affect the threaded coupling between driver portion 389 and connector mandrel 319. However, clockwise rotation of central body 313 will affect the coupling between driver portion 389 and buttress member 375 by moving driver portion 389 axially downward relative to buttress member 375. Since the coupling between driver portion 389 and connector mandrel 319 is unaffected by the application of clockwise (right-hand) torquing of central body 313, central body 313 and connector mandrel 319 will travel downward together relative to buttress member 375. Central body 313 need only be torqued sufficiently to cause annular sealing member 343 and gripping assembly 345 to respectively sealingly and grippingly engage inner surface 305 of tubular segment 303. After a proper connection has been made set screws 385 are tightened against central body 313 to prevent loss of applied torque to the connection, and subsequent loss of energizing force in the sealing member 321 and gripping member 323.

Figure 4C:
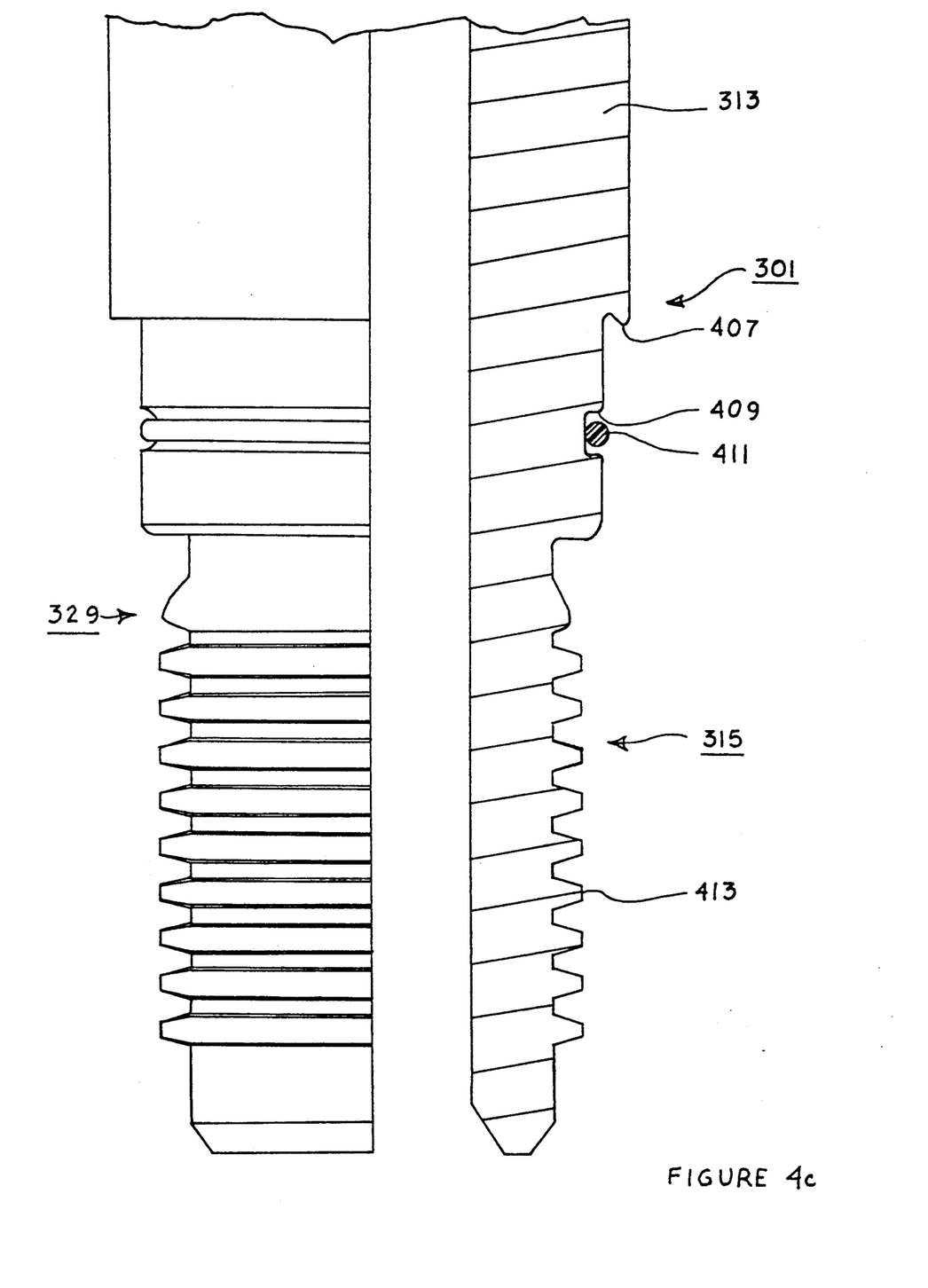

FIG. 5c is identical to that of FIG. 4c, but is provided to depict that lower region 329 of tubing connector 301 is unaffected by the set or unset condition of tubular connector 301 with respect to tubing segment 303.

Tubing connector 301 of the present invention provides a reliable, and low-profile connector for use with fluid-actuated wellbore tools which are conveyable within a wellbore on a coiled tubing string. While the invention has been shown in only one of its forms, it is not thus limited but is susceptible to various changes and modifications without departing from the spirit thereof.

What is claimed is:

1. A connector for coupling a tubular member to a selected apparatus, said tubular member having inner and outer surfaces, and terminating at an end, said inner surface at least in-part defining a central bore, comprising:
   a central body having first and second ends;
   a linkage member disposed at said first end of said central body for connecting said central body to said selected apparatus;
   a tubing coupler disposed at said second end of said central body, operable in an insertion mode of operation in a radially-reduced position for insertion at said end into said central bore of said tubular member, and a coupling mode of operatin in a radially-expanded position for grippingly and sealingly engaging said inner surface of said tubular member.

2. A connector according to claim 1, wherein said tubular coupler comprises:
   a connector mandrel coupled to said central body and having a radial dimension smaller than said central bore of said tubular member to allow insertion into said central bore of said tubular member;
   a sealing member, circumferentially disposed about at least a portion of said connector mandrel;

a gripping member, circumferentially disposed about at least a portion of said connector mandrel; and means for selectively urging said sealing member and said gripping member radially outward from said connector mandrel into respective sealing and gripping engagement with said inner surface of said tubular member.

3. A connector according to claim 1, wherein said tubing coupler comprises:

a connector mandrel coupled to said central body and having a fixed radial dimension which is smaller than said central bore of said tubular member to allow insertion into said central bore of said tubular member;

a sealing member, circumferentially disposed about at least a portion of said connector mandrel, and operable between an unset position with a reduced radial dimension and a set position with an expanded radial dimension, said sealing member being movable between said unset position and said set position in response to axial compression;

a gripping member circumferentially disposed about at least a portion of said connector mandrel; and actuator means for selectively urging said gripping member into gripping engagement with said inner surface of said tubular member, and for axially compressing said sealing member to urge it from an unset position out of contact with said inner surface of said tubular member to a set position in contact with said inner surface of said tubular member.

4. A connector according to claim 1, wherein said tubing coupler comprises:

a connector mandrel coupled to said central body and having a selected axial length and a fixed radial dimension which is smaller than said central bore of said tubular member to allow insertion into said central bore of said tubular member;

a sealing member, circumferentially disposed about at least a portion of said connector mandrel, and operable between an unset position with a reduced radial dimension and a set position with an expanded radial dimension, said sealing member being movable between said unset position and said set position in response to axial compression;

a gripping assembly including a gripping slip which slidably engages a cone member, and which is operable between an unset position with a reduced radial dimension and a set position with an expanded radial dimension, said gripping assembly being movable between said unset position and said set position in response to axial force; and actuator means for adjusting said axial length of said connector mandrel to apply an axial force to said gripping assembly and to axially compress said sealing member, simultaneously moving said gripping assembly and sealing member from said unset positions to said set positions to grippingly and sealingly engage said inner surface of said tubular member.

5. A connector according to claim 1, wherein said tubing coupler comprises:

a connector mandrel coupled to said central body and having a fixed radial dimension which is smaller than said central bore of said tubular member to allow insertion into said central bore of said tubular member;

a sealing member, circumferentially disposed about at least a portion of said connector mandrel, and operable between an unset position with a reduced radial dimension and a set position with an expanded radial dimension, said sealing member being movable between said unset position and said set position in response to axial compression;

a gripping assembly including:

a cone member circumferentially disposed about said connector mandrel, and having an inclined outer surface;

a slip member circumferentially disposed about a portion of said connector mandrel, having outer and inner surfaces, with said outer surface including a plurality of gripping teeth and said inner surface at least in-part defining an inclined region which slidably engages said inclined outer surface of said cone member;

said gripping assembly being movable between a radially-reduced insertion position with said cone member and said slip member in axial alignment, and a radially-enlarged setting position with said slip member wedged over said cone member, in response to axial force; and an actuator member for selectively applying axial force to said gripping assembly to urge it between said insertion position and said setting position, and simultaneously axially compressing said sealing member to urge it between said insertion position and said setting position.

6. A connector for coupling a segment of coiled tubing to a selected wellbore tool, said segment of coiled tubing having inner and outer surfaces, and terminating at a lip portion, said inner surface at least in-part defining a central bore with a predetermined inner diameter which is accessible from said lip portion, comprising:

a connector mandrel, insertable in said central bore of said segment of coiled tubing;

an annular cavity, having a preselected area, which is defined at least in-part by an exterior surface of said connector mandrel and at least in-part by said inner surface of said segment of coiled tubing;

an annular sealing member circumferentially disposed about said external surface of said connector mandrel within said annular cavity, said annular sealing member being movable between a radially-reduced insertion position, out of contact with said central bore of said segment of coiled tubing, and a radially-enlarged sealing position, in contact with said central bore of said segment of coiled tubing, in response to compressive force;

a gripping assembly, circumferentially disposed about at least a portion of said connector mandrel within said annular cavity, said gripping assembly being movable between a radially-reduced insertion position, out of contact with said central bore of said segment of coiled tubing, and a radially-expanded gripping position, in contact with said central bore of said segment of coiled tubing, in response to setting force applied thereto;

means for diminishing said preselected area of said annular cavity to simultaneously apply compressive force to said annular sealing member and setting force to said gripping assembly to urge said annular sealing member and said gripping assembly into respective sealing and gripping engagement with said central bore of said segment of coiled tubing; and linkage means for mechanically linking said wellbore tool to said connector mandrel.

7. A connector according to claim 6, wherein said means for diminishing said preselected area of said annular cavity is responsive to torque.

8. A connector according to claim 6, wherein said annular sealing member comprises an annular elastomeric sealing sleeve which is energized by diminishment of said annular cavity and urged into sealing engagement with said central bore of said segment of coiled tubing.

9. A connector according to claim 6, wherein said gripping assembly comprises a plurality of interlocking assembly members which are urged radially outward from said annular cavity in response to application of an axial loading force.

10. A connector according to claim 6, wherein said means for diminishing comprises means for shortening said annular cavity in response to application of torque.

11. A connector for coupling a segment of coiled tubing to a selected wellbore tool, said segment of coiled tubing having inner and outer surfaces, and terminating at a lip portion, said inner surface at least in-part defining a central bore with a predetermined inner diameter which is accessible from said lip portion, comprising:

a force transmitting sleeve having a selected axial length and including an external shoulder member providing an upper boundary for an adjoining annular cavity which is defined at least in-part by said external shoulder and at least in-part by an external surface of said force transmitting sleeve, said external surface having an outer diameter which is less than said inner diameter of said central bore of said tubular member;

an annular sealing member circumferentially disposed about said external surface of said force transmitting sleeve within said annular cavity, said annular sealing member having upper and lower ends, with said upper end in abutment with said external shoulder member of said force transmitting sleeve, said annular sealing member being movable between a radially-reduced insertion position, out of contact with said central bore of said segment of coiled tubing, and a radially-enlarged sealing position, in contact with said central bore of said segment of coiled tubing, in response to axial compression;

a gripping assembly, circumferentially disposed about at least a portion of said force transmitting sleeve within said annular cavity, in axial alignment with said annular sealing member, said gripping assembly being movable between a radially-reduced insertion position, out of contact with said central bore of said segment of coiled tubing, and a radially-expanded gripping position in contact with said central bore of said segment of coiled tubing, in response to axial force;

a buttress member including a contoured portion for receiving said lip portion of said segment of coiled tubing;

a torque receiving member rotatable relative to said segment of coiled tubing;

torque translator means for receiving torque from said torque receiving member and contracting said force transmitting sleeve relative to said buttress member to compress said annular sealing member, urging it from said radially-reduced insertion position to said radially-enlarged sealing position, and to axially load said gripping assembly, urging it from said radially-reduced insertion position to said radially-expanded gripping position; and means for coupling said wellbore tool to at least one of said force transmitting sleeve, said buttress member, and said torque receiving member.

12. A connector according to claim 11, wherein said annular sealing member comprises an annular elastomeric sealing sleeve.

13. A connector according to claim 11, wherein said annular sealing member is disposed between said external shoulder member of said force transmitting sleeve and said gripping assembly, and wherein said gripping assembly is in abutment with said buttress member.

14. A connector according to claim 11, wherein contraction of said force transmitting sleeve shortens said annular cavity.

15. A connector according to claim 11, further comprising:

upper and lower extrusion barriers coupled to said upper and lower ends of said annular sealing member to prevent extrusion.

16. A connector according to claim 11, further comprising:

means for securing together said buttress member and said torque receiving member to prevent further rotation of said torque receiving member relative to said buttress member once said annular sealing member and gripping assembly are in respective sealing and gripping engagement with said segment of coiled tubing.

17. A connector according to claim 11, further comprising:

a flow path through said connector for allowing fluid communication between said central bore of said segment of coiled tubing and said wellbore tool.

18. A connector according to claim 11, wherein said buttress member includes a shoulder which provides a lower boundary for said annular cavity.

19. A connector according to claim 11, wherein said torque translator includes a plurality of threaded connections between said force transmitting sleeve, said buttress member, and said torque receiving member, wherein rotation of said torque receiving member in a selected direction results in contraction of said force transmitting sleeve, and wherein rotation of said torque receiving member in an opposite direction results in extension of said force transmitting sleeve.

20. A connector according to claim 11, wherein said gripping assembly comprises:

a cone member circumferentially disposed about said force transmitting sleeve within said annular cavity, disposed in abutment with said lower end of said annular sealing member, said cone member having an inclined outer surface;

a slip member circumferentially disposed about a portion of said force transmitting sleeve, having outer and inner surfaces, with said outer surface including a plurality of gripping teeth and said inner surface at least in-part defining an inclined region which slidably engages said inclined outer surface of said cone member; and said gripping assembly being movable between a radially-reduced insertion position with said cone member and said slip member in axial alignment, and a radially-enlarged setting position with said slip member wedged over said cone member and said gripping teeth engaging said central bore of said segment of coiled tubing, in response to axial force applied thereto as a result of contraction of said force transmitting sleeve.

21. A connector according to claim 11, wherein said annular sealing member comprises an annular thermoplastic sealing sleeve.

* * * * *